US011750968B2

(12) United States Patent
Chu

(10) Patent No.: US 11,750,968 B2
(45) Date of Patent: *Sep. 5, 2023

(54) SECOND-ORDER GRADIENT MICROPHONE SYSTEM WITH BAFFLES FOR TELECONFERENCING

(71) Applicant: Plantronics, Inc., Santa Cruz, CA (US)

(72) Inventor: Peter L. Chu, Lexington, MA (US)

(73) Assignee: Plantronics, Inc., Santa Cruz, CA (US)

( * ) Notice: Subject to any disclaimer, the term of this patent is extended or adjusted under 35 U.S.C. 154(b) by 357 days.

This patent is subject to a terminal disclaimer.

(21) Appl. No.: 17/122,204

(22) Filed: Dec. 15, 2020

(65) Prior Publication Data

US 2021/0112334 A1   Apr. 15, 2021

Related U.S. Application Data

(63) Continuation of application No. 16/600,283, filed on Oct. 11, 2019, now Pat. No. 10,904,657.

(51) Int. Cl.
*H04R 1/40* (2006.01)
*H04N 7/15* (2006.01)
(Continued)

(52) U.S. Cl.
CPC .............. *H04R 1/406* (2013.01); *H04N 7/15* (2013.01); *H04N 23/54* (2023.01); *H04R 1/025* (2013.01);
(Continued)

(58) Field of Classification Search
CPC ....................................................... H04R 1/40
See application file for complete search history.

(56) References Cited

U.S. PATENT DOCUMENTS 4,184,048 A * 1/1980 Alcaide ................. H04M 3/569
381/83
4,965,775 A 10/1990 Elko et al.
(Continued)

FOREIGN PATENT DOCUMENTS

EP         2168396 A2      3/2010
JP         H06233371 A     8/1994

OTHER PUBLICATIONS

International Search Report issued in corresponding International Application No. PCT/US2020/055111 dated Feb. 11, 2021 (5 pages).
(Continued)

*Primary Examiner* — Olisa Anwah
(74) *Attorney, Agent, or Firm* — QUARLES & BRADY LLP

(57) ABSTRACT

An audio device including a housing having a side facing outwardly of the housing, the housing further having a first mounting position disposed on the side. The side has a first portion and a second portion, the first portion opposite the second portion relative to the first mounting position. The audio device also includes a first omnidirectional microphone disposed on the first portion. The audio device also includes a second microphone disposed on the first mounting position. The second microphone may be a second-order microphone. The second-order microphone has a first-order microphone disposed within a first platform mounted a distance from the first mounting position. The audio device also includes a first speaker disposed on the second portion. The first speaker is further disposed such that an audio output of the first speaker falls within a null of the second microphone.

20 Claims, 7 Drawing Sheets

(51) Int. Cl.
*H04R 1/02* (2006.01)
*H04R 1/04* (2006.01)
*H04R 3/00* (2006.01)
*H04R 29/00* (2006.01)
*H04N 23/54* (2023.01)

(52) U.S. Cl.
CPC ............... *H04R 1/04* (2013.01); *H04R 3/005* (2013.01); *H04R 29/005* (2013.01)

(56) References Cited

U.S. PATENT DOCUMENTS

| | | | |
|---|---|---|---|
| 5,121,426 A * | 6/1992 | Baumhauer, Jr. | H04M 1/20 381/83 |
| 5,539,834 A * | 7/1996 | Bartlett | H04M 1/19 381/361 |
| 5,748,757 A | 5/1998 | Kubli et al. | |
| 5,848,172 A * | 12/1998 | Allen | H04R 1/406 381/357 |
| 6,072,522 A | 6/2000 | Ippolito et al. | |
| 7,720,232 B2 * | 5/2010 | Oxford | H04M 9/082 379/406.01 |
| 8,219,400 B2 | 7/2012 | Chu | |
| 8,526,632 B2 * | 9/2013 | Cutler | H04N 7/142 381/92 |
| 9,613,628 B2 | 4/2017 | Jing et al. | |
| 2003/0044025 A1 | 3/2003 | Ouyang et al. | |
| 2003/0142836 A1 | 7/2003 | Warren et al. | |
| 2003/0160862 A1 * | 8/2003 | Charlier | H04R 3/005 348/14.02 |
| 2006/0093128 A1 * | 5/2006 | Oxford | H04M 9/082 379/406.01 |
| 2010/0128868 A1 * | 5/2010 | Suppappola | H04M 9/082 379/406.06 |
| 2010/0260351 A1 * | 10/2010 | Diethorn | H04M 1/6033 381/93 |
| 2015/0195489 A1 | 7/2015 | Sobti et al. | |
| 2016/0173978 A1 * | 6/2016 | Li | G10L 21/0364 381/92 |
| 2017/0188141 A1 | 6/2017 | Rung et al. | |

OTHER PUBLICATIONS

Written Opinion of the International Searching Authority issued in corresponding International Application No. PCT/JS2020/055111 dated Feb. 11, 2021 (8 pages).

* cited by examiner

SECOND-ORDER GRADIENT MICROPHONE SYSTEM WITH BAFFLES FOR TELECONFERENCING

CROSS REFERENCE TO RELATED APPLICATIONS

This application is a continuation of, and thereby claims benefit under 35 U.S.C. § 120 to, U.S. patent application Ser. No. 16/600,283, filed on Oct. 11, 2019, which is hereby incorporated by reference herein.

BACKGROUND

Teleconferencing devices are commonly used so that remotely situated people may have a meeting without using a handset. The microphone and the speakers of the teleconferencing device are both located on the teleconferencing device. Thus, problems of both noise and feedback can occur, reducing the quality of sound. For example, the audio projected by the speaker may be fed back into the microphone, which is then transmitted back to the remote person who is talking. In other words, far-end speech returns to the far end through the near-end microphone array. Likewise, audio noise anomalies can arise when using second-order microphones to detect audio signals below a particular frequency threshold.

SUMMARY

In general, in one aspect, one or more embodiments relate to an audio device. The audio device includes a housing having a side facing outwardly of the housing, the housing further having a first mounting position disposed on the side. The side has a first portion and a second portion, the first portion opposite the second portion relative to the first mounting position. The audio device also includes a first omnidirectional microphone disposed on the first portion. The audio device also includes a second microphone disposed on the first mounting position. The second microphone may be a second-order microphone. The second-order microphone has a first-order microphone disposed within a first platform mounted a distance from the first mounting position. The audio device also includes a first speaker disposed on the second portion. The first speaker is further disposed such that an audio output of the first speaker falls within a null of the second microphone.

One or more embodiments also relate to a method of processing audio signals. The method includes receiving, at an audio device, sound signals as input signals. The audio device includes an omnidirectional microphone and a first second-order microphone. The method also includes using the omnidirectional microphone for frequencies above about four kilohertz to generate a high pass output. The method also includes using the first second-order microphone for frequencies below about four kilohertz to generate a low pass output. The method also includes summing the high pass output and the low pass output to produce a net output. The method also includes processing the net output.

One or more embodiments also relate to a method of manufacturing. The method of manufacturing includes manufacturing a housing including a side facing outwardly of the housing. The housing further includes a first mounting position disposed on the side. The side has a first portion and a second portion, the first portion opposite the second portion relative to the first mounting position. The method of manufacturing also includes connecting a first omnidirectional microphone to the first portion. The method of manufacturing also includes connecting a second microphone to the first mounting position. The second microphone includes a second-order microphone. The second-order microphone includes a first-order microphone disposed within a first platform mounted a distance from the first mounting position. The method of manufacturing also includes connecting a first speaker disposed on the second portion. The first speaker is further disposed such that an audio output of the first speaker falls within a null of the second microphone.

Other aspects of the invention will be apparent from the following description and the appended claims.

DETAILED DESCRIPTION

Figure 1A:
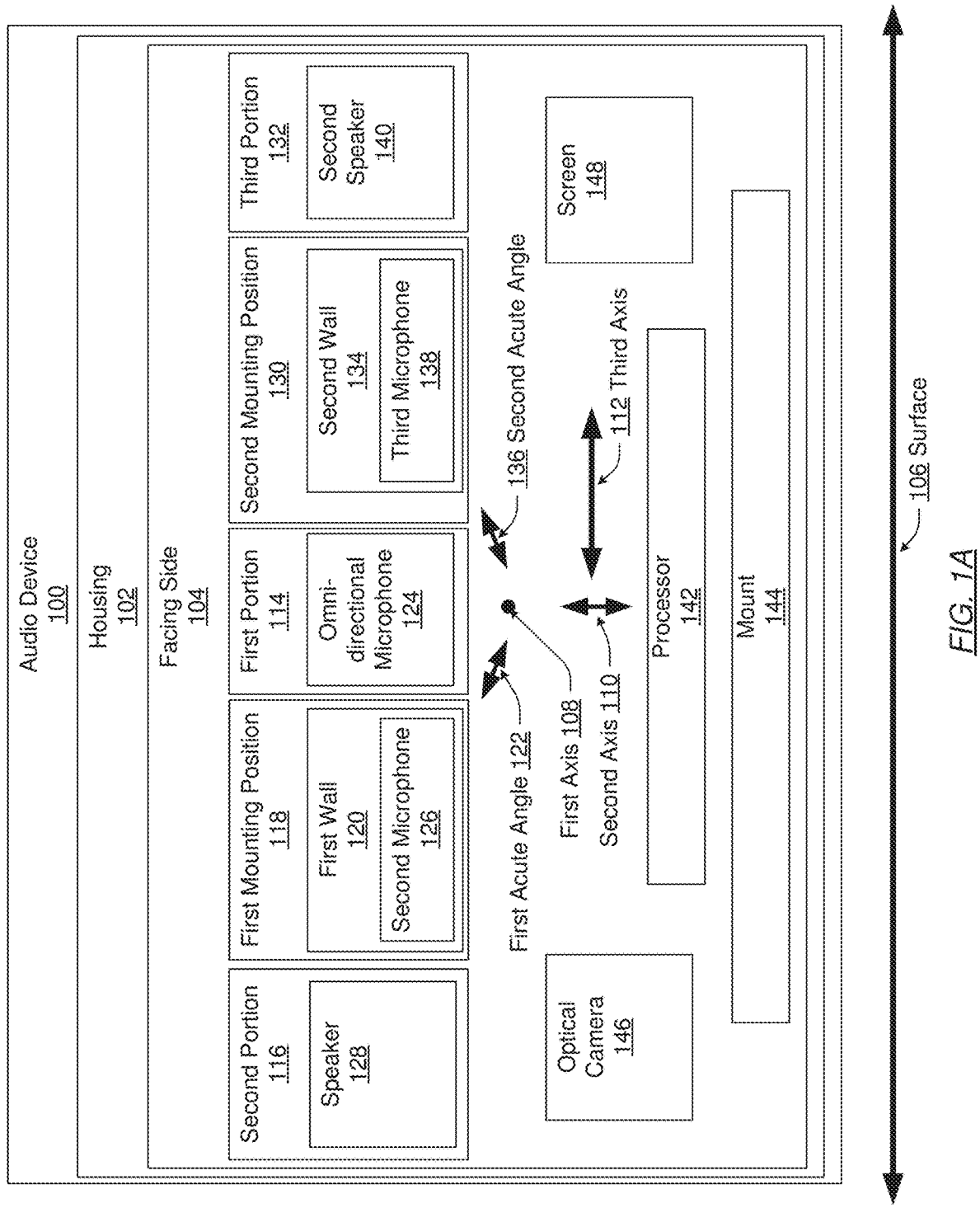
FIG. 1A and FIG. 1B show an audio device and reference axes for the audio device, in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Throughout the application, the term "about," when used with respect to a physical property that may be measured, refers to an engineering tolerance anticipated or determined by an engineer or manufacturing technician of ordinary skill in the art. Specifically, the term, "about," refers to the physical property being satisfied exactly or being within the engineering tolerance. The exact quantified degree of an engineering tolerance depends on the product being produced and the technical property being measured. For a non-limiting example, two angles may be "about congruent" if the values of the two angles are within ten percent of each other. However, if an engineer determines that the engineering tolerance for a particular product should be tighter, then "about congruent" could be two angles having values that are within one percent of each other. Likewise, engineering tolerances could be loosened in other embodiments, such that "about congruent" angles have values within twenty percent of each other.

In general, embodiments of the invention relate to an improved audio device, and, in particular, to an improved teleconferencing system. The one or more embodiments reject undesirable audio feedback caused by far end audio emanating from the system's speakers while concurrently providing high fidelity reception at the system's microphones for near end users. The one or more embodiments also reduce undesirable noise or audio signal anomalies by using a combination of microphones to detect different frequency spectrums of the received audio signals. Thus, by using the combination of microphones, a talker on the far end will hear little or no of the talker's own voice fed back into the system, and a talker on the near end will sound clear to a listener at the far end.

"Near end" refers a first physical location in which the audio device is located. The term "far end" refers to a second physical location remote from the audio system. Multiple "far end" locations may exist. The audio device at the near end is communicatively connected with a second audio device at the far end, such as with audio and visual electronic and/or optical signals through wired and/or wireless mediums.

FIG. 1A shows an audio device (100), in accordance with one or more embodiments of the invention. An audio device (100) is a teleconferencing system that is at least capable of audio communication. Further, the audio device may be capable of visual communication (e.g., transmitting a video feed and/or receiving a video feed). Audio device (100) has a housing (102). The housing (102) is a casing that protects the hardware of the audio device. The housing (102) may be any suitable material for holding or mounting the other components of the audio device (100), such as but not limited to plastics, metals, composite materials, etc.

The housing (102) has a facing side (104) which may face the user at the near end. When the audio device is mounted on a surface (106), such as on a table or desk, the facing side (104) faces the user and may have an orientation that is perpendicular to the surface and generally facing the near side user. However, the facing side (104) may be angled with respect to the surface. The housing (102) could be attached to a wall or other vertical or angled surface. Regardless of how the housing (102) is mounted or how the housing (102) is resting on the surface (106), the facing side (104) generally will be facing the near end user.

Figure 3:
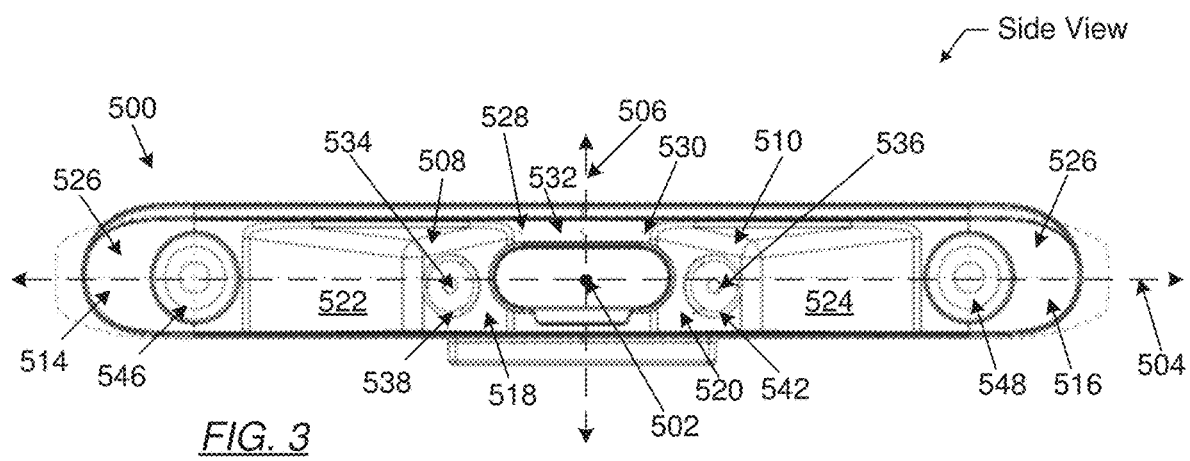
FIG. 3, FIG. 4, and FIG. 5 show an example of a teleconferencing audio device, in accordance with one or more embodiments of the invention.
Figure 4:
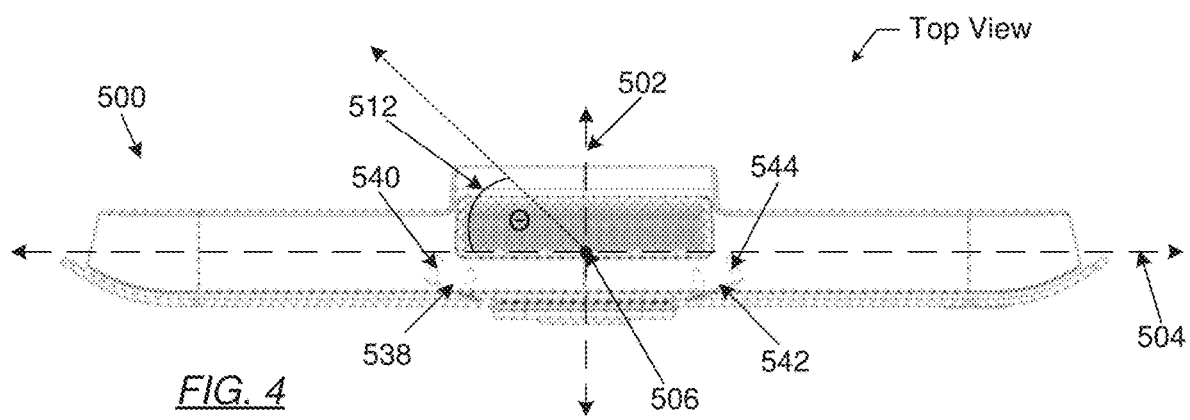
Figure 5:
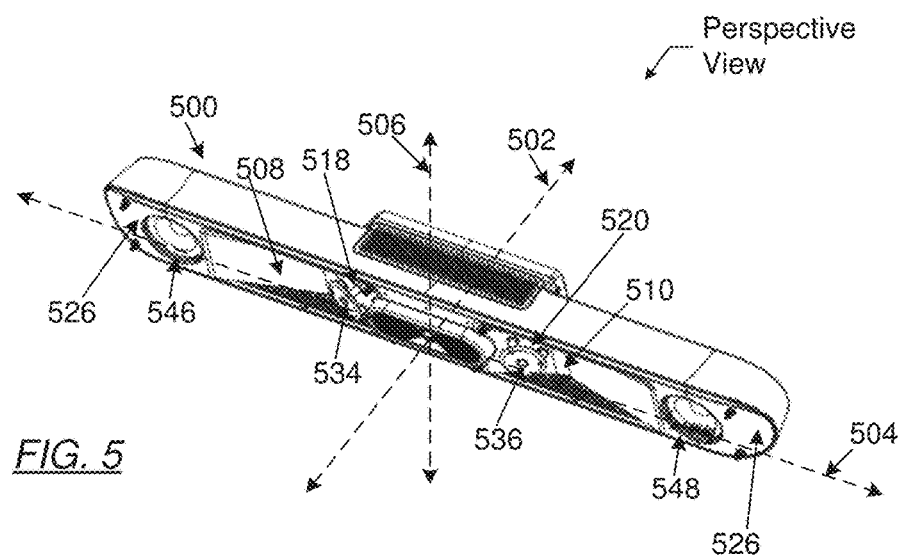

The facing side (104) may have a variety of dimensions and shapes, but has an orientation defined by first axis (108), a second axis (110), and a third axis (112). The first axis (108) denoted by a dot in FIG. 1A is perpendicular to the facing side (104) and is oriented into and outwardly of the housing (102). In FIG. 1A, the first axis is perpendicular to the page and extends out of the page. The second axis (110) is parallel to the facing side (104) and perpendicular to the first axis (108). The third axis (112) that is parallel to the facing side (104) and perpendicular to both the first axis (108) and the second axis (110). If the housing (102) is resting on the surface (106) that is about parallel to the ground (such as a flat table or desk), then the first axis (108) points generally at the near end user, the second axis (110) is oriented vertically, and the third axis (112) is oriented horizontally. An example of these axes is shown in FIG. 3 through FIG. 5.

The facing side (104) includes at least a first portion (114), at least a second portion (116), and at least a first mounting position (118). The first mounting position (118) is disposed between the first portion (114) and the second portion (116). This arrangement is also shown in FIG. 3.

The first mounting position (118) may be defined by at least one first wall (120), though may be any physical platform or connector upon which a microphone may be mounted. The term "at least one first wall" is used, because the first mounting position (118) could be defined by a single wall that is curved, or may be defined by multiple surfaces that intersect each other at corners. In the latter case, the first wall (120) directly connects to the first portion (114) of the facing side (104).

In either case, the first wall (120) may be disposed inwardly into the housing (102) or outwardly away from the housing (102). In other words, the first mounting position (118) may be inset into the housing, or may protrude outwardly from the housing, though in another embodiment may be flush with the facing side (104). Regardless of whether the first mounting position (118) is disposed inwardly, outwardly or flush with the facing side (104), the first wall (120) may be disposed at a first acute angle (122) relative to the first axis (108). If the first wall (120) is curved, then the first acute angle (122) is defined at the intersection of the first portion (114) and the first wall (120). An example of the first mounting position (118) being disposed inwardly into the housing (102) at an acute angle is shown in FIG. 3 through FIG. 5.

An omnidirectional microphone (124) is disposed on the first portion (114) of the facing side (104). "Disposed on" refers to any direct or indirect mounting scheme, including gluing, integral formation with another component, bolting, screwing, nailing, clipping, tension fitting, mounting, or any other suitable method for securing components together. While other types of microphones could be disposed on the first portion (114) of the facing side (104), an omnidirectional microphone may be used as described further below in order to assist with feedback rejection.

Figure 6:
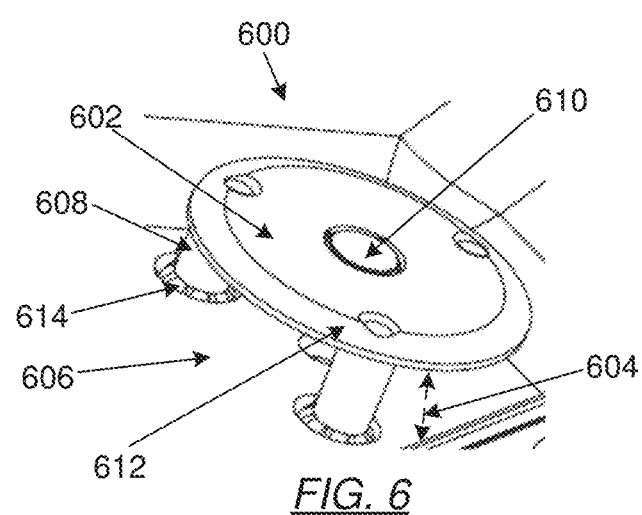
FIG. 6 shows an example of a second-order microphone used in the audio device shown in FIG. 3 or the teleconferencing audio device shown in FIG. 3 through FIG. 5, in accordance with one or more embodiments of the invention.

A second microphone (126) is disposed on the first wall (120) of the first mounting position (118). The second microphone (126) is a second-order microphone, an example of which is shown in FIG. 6. As shown in FIG. 6, the second microphone (126) may include a platform, otherwise known as a baffle, that is mounted a distance from the first wall (120) and is about parallel to the first wall (120). The platform may be a disc about 1.5 inches in diameter, in which case the distance from the first wall (120) may be about 0.45 inches. A first-order microphone, such as but not limited to a cardioid electret capsule, may be disposed in the platform. The platform may have other shapes and dimensions, and may be separated from the first wall (120) by other distances. While other types of microphones could be disposed on the first wall (120) of the first mounting position (118), a second-order microphone may be used as described further below in order to assist with feedback rejection.

A speaker (128) is disposed on the second portion (116) of the facing side (104). The speaker (128) may be any speaker capable of converting electrical or optical signals into audio waves. In the case that the audio device (100) is a telecommunications device, the speaker (128) is used at least to project the speech or other sounds being communicated from the far end.

The audio device (100) may have additional portions and mounting positions. For example, the housing (102) may have a second mounting position (130) disposed with respect the facing side (104). The second mounting position (130) may be opposite the first mounting position (118) relative to the first portion (114). The housing (102) may also have a third portion (132) disposed opposite the second portion (116) relative to the first portion (114) (i.e., in an arrangement similar to that shown in FIG. 1).

The second mounting position (130) may be defined by at least one second wall (134), though may be any physical platform or connector upon which a microphone may be mounted. The term "at least one second wall" is used, because the second mounting position (130) could be defined by a single wall that is curved, or may be defined by multiple surfaces that intersect each other at corners. In the latter case, the second wall (134) directly connects to the first portion (114) of the facing side (104), opposite the first mounting position (118).

In either case, the second wall (134) may be disposed inwardly into the housing (102) or outwardly away from the housing (102). In other words, the second mounting position (130) may be inset into the housing, or may protrude outwardly from the housing, though in another embodiment may be flush with the facing side (104). In an embodiment, the second mounting position (130) may be disposed differently than the first mounting position (118) with respect to being inwardly or outwardly disposed with respect to the housing (102) or flush with the housing (102). Regardless of whether the second mounting position (130) is disposed inwardly, outwardly or flush with the facing side (104), the second wall (134) may be disposed at a second acute angle (136) relative to the first axis (108). If the second wall (134) is curved, then the second acute angle (136) is defined at the intersection of the first portion (114) and the second wall (134). An example of the first mounting position (118) being disposed inwardly into the housing (102) at an acute angle is shown in FIG. 3 through FIG. 5.

A second omnidirectional microphone (not shown) may be disposed on the first portion (114) of the facing side (104). Three or more omnidirectional microphones, such as microelectromechanical microphones, may be disposed on the first portion (114) of the facing side (104).

A third microphone (138) may be disposed on the second wall (134) of the second mounting position (130). The third microphone (138) also may be a second-order microphone, an example of which is also shown in FIG. 6. As shown in FIG. 6, the third microphone (138) may include a platform, otherwise known as a baffle, that is mounted a distance from the second wall (134). While other types of microphones could be disposed on the second wall (134) of the second mounting position (130), a second-order microphone may be used as described further below in order to assist with feedback rejection, as well as to improve the angle of audio reception coverage relative to the use of only a single second-order microphone on the first wall (120) of the first mounting position (118).

A second speaker (140) may be disposed on the third portion (132) of the facing side (104). The second speaker (140) also may be any speaker capable of converting electrical or optical signals into audio waves. In the case that the audio device (100) is a telecommunications device, the second speaker (140) also is used at least to project the speech or other sounds being communicated from the far end by the other telecommunication device.

The first acute angle (122) and the second acute angle (136) are defined as "acute" because both angles are less than ninety degrees as measured between the first axis (108) and the third axis (112). This arrangement is also shown in FIG. 1B, as well as FIG. 3 through FIG. 5.

Figure 1B:
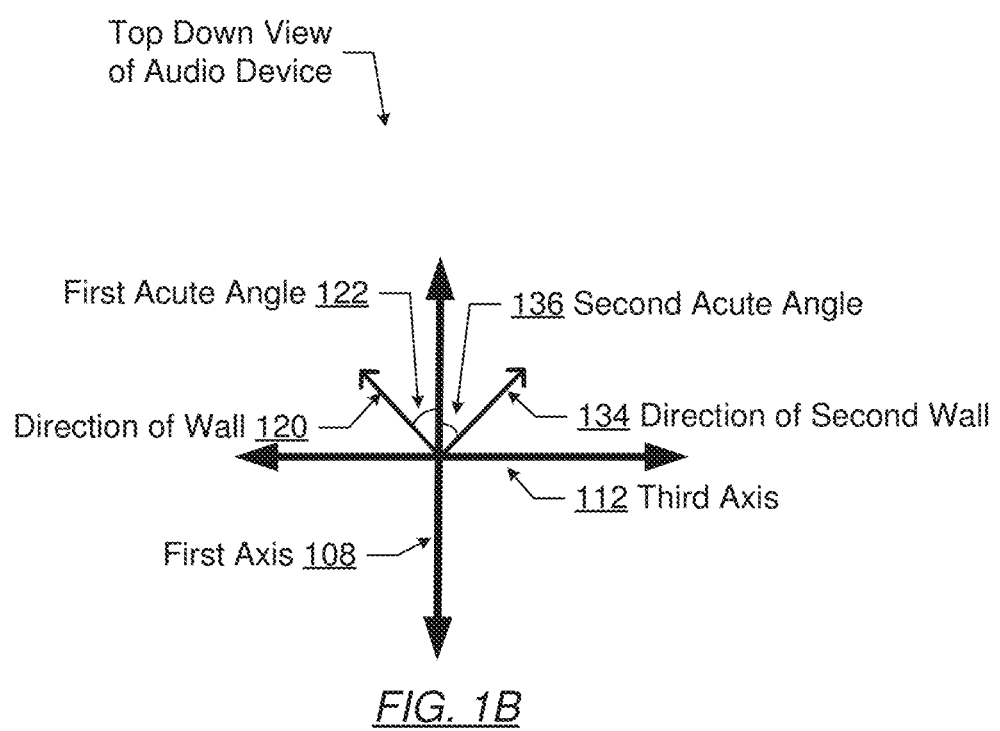

Turning to FIG. 1B, the axes and angles described above are shown in greater detail. In particular, FIG. 1B shows a top-down view of the audio device. The first axis (108) is vertical with respect to FIGS. 1B and 1s vertical with respect to an audio device resting on a flat surface relative to the direction of gravity. The third axis (112) is horizontal with respect to FIG. 1B and the flat surface. The second axis (110) described in FIG. 1A may be conceived of as extending into and out of FIG. 1B through the intersection of the first axis (108) and the third axis (112).

The directions of the first wall (120) and the second wall (134) described with respect to FIG. 1A are shown as vectors between the first axis (108) and the third axis (112). The angles these vectors make with respect to the first axis (108) and the third axis (112) are shown as the first acute angle (122) and the second acute angle (136).

In an embodiment, the first acute angle (122) and the second acute angle (136) are congruent. In an embodiment, the first acute angle (122) is about positive twenty degrees and the second acute angle (136) is about minus twenty degrees. However, in other embodiments the first acute angle (122) and the second acute angle (136) need not be congruent, and may vary anywhere between about zero degrees to about ninety degrees.

As described further with respect to FIG. 3, the various microphones may be configured and/or placed on the facing side (104), walls (120, 134) or the portions (114, 116, 132) of the housing (102) in order to aid with feedback rejection. For example, at least one omnidirectional microphone (124) may be configured to receive frequencies above about four kilohertz. The second microphone (126) and the third microphone (138) may be configured to receive frequencies below about four kilohertz. These ranges may be varied based on the distance between the first wall (120) and the baffle of the second microphone (126), as changing this distances changes the frequency at which acoustic anomalies may develop when receiving audio signals at the second microphone (126) and the third microphone (138).

The audio device (100) may include additional features. For example, the audio device (100) may also include a processor (142) and software, other hardware electronics such as an application specific integrated circuit, for processing electronic signals generated by the various microphones of the audio device (100) and received from one or more far end devices. The processor (142), possibly together with software, may be configured to implement a maximum energy algorithm to select from which of the second microphone (126) and the third microphone (138) sound signals will be processed by the processor (142). This process is further described with respect to FIG. 3.

Another feature which the audio device (100) may have is a mount (144). The mount may be used to rest the audio device (100) housing (102) on a surface, such as a desk or table. In an embodiment, the mount (144) may be a swivel mount such that a near end user can change the orientation of the housing (102) with respect to the near end user. In other words, the swivel mount allows rotation of the housing with respect to a mounting surface of the audio device. In one or more embodiments, the mount (144) may allow for attachment of the audio device (100) to a wall or the like.

Another feature which the audio device (100) may have is one or more optical cameras, such as optical camera (146). The optical camera (146) may be used to collect video data and transmit the video data to present on screen on a far end device, thereby enabling video conferencing. Similarly, one or more screens, such as screen (148) may be present for displaying video images taken by a far end device and transmitted to the audio device (100). Alternatively, or perhaps in addition to the screen, the audio device (100) may include a projector for projecting video onto a surface. When connected with a screen (148) or a projector, the audio device (100) may be characterized as an audio-visual conferencing system.

Other variations are possible. For example, the speaker (128), second microphone (126), omnidirectional microphone (124), third microphone (138), and second speaker (140) may all lie along or about along one line parallel to the third axis (112). However, one or more of these components may have different orientations with respect to each other. For example, the omnidirectional microphone (124) may be disposed on the first portion (114) such that the omnidirectional microphone (124) is above the second microphone (126) and third microphone (138) along the second axis (110) relative to the mount (144). Similarly, the speaker (128) and the second speaker (140) may be disposed above or below the second microphone (126) and third microphone (138) along the second axis (110) relative to the mount (144). Other variations of how these components are mounted with respect to each other are contemplated.

While FIG. 1A and FIG. 1B show a configuration of components, other configurations may be used without departing from the scope of the invention. For example, various components may be combined to create a single component. As another example, the functionality performed by a single component may be performed by two or more components.

Figure 2A:
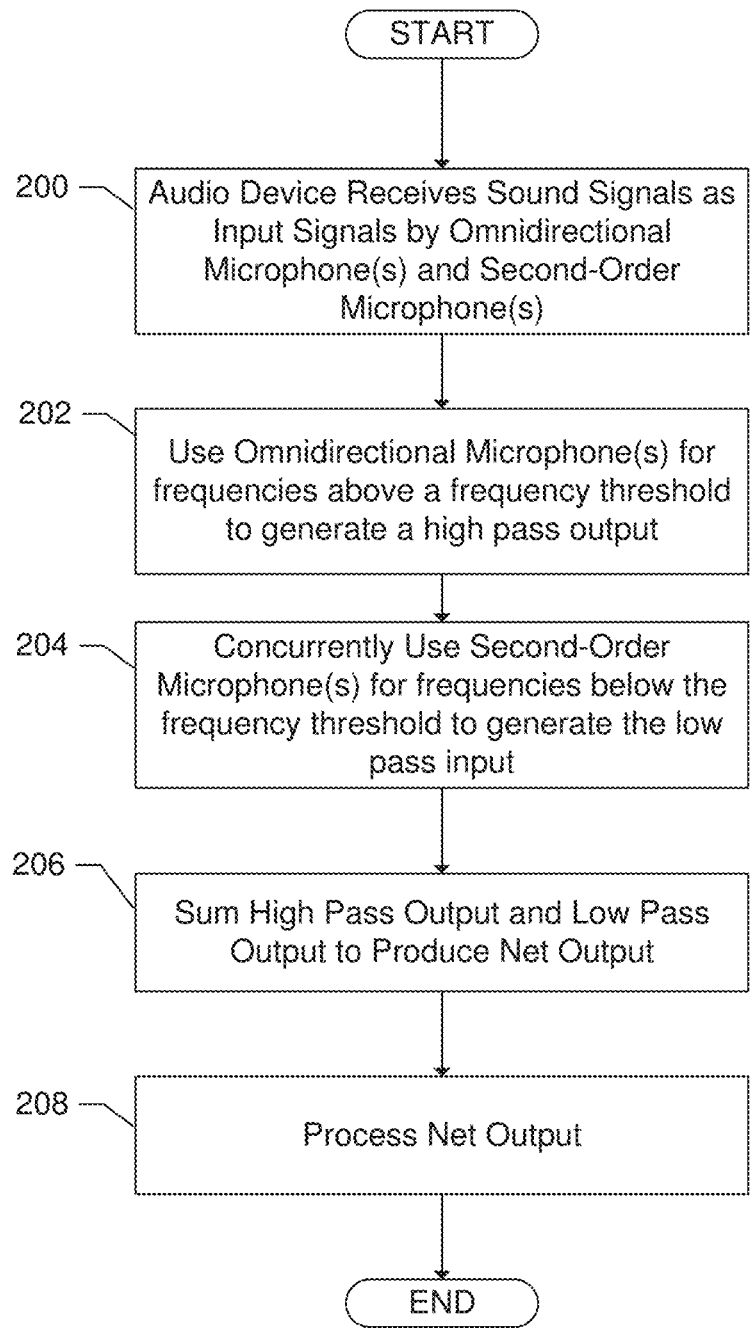
FIG. 2A and FIG. 2B show methods of processing audio signals using the audio device shown in FIG. 1A and FIG. 1B, in accordance with one or more embodiments of the invention.
Figure 2B:
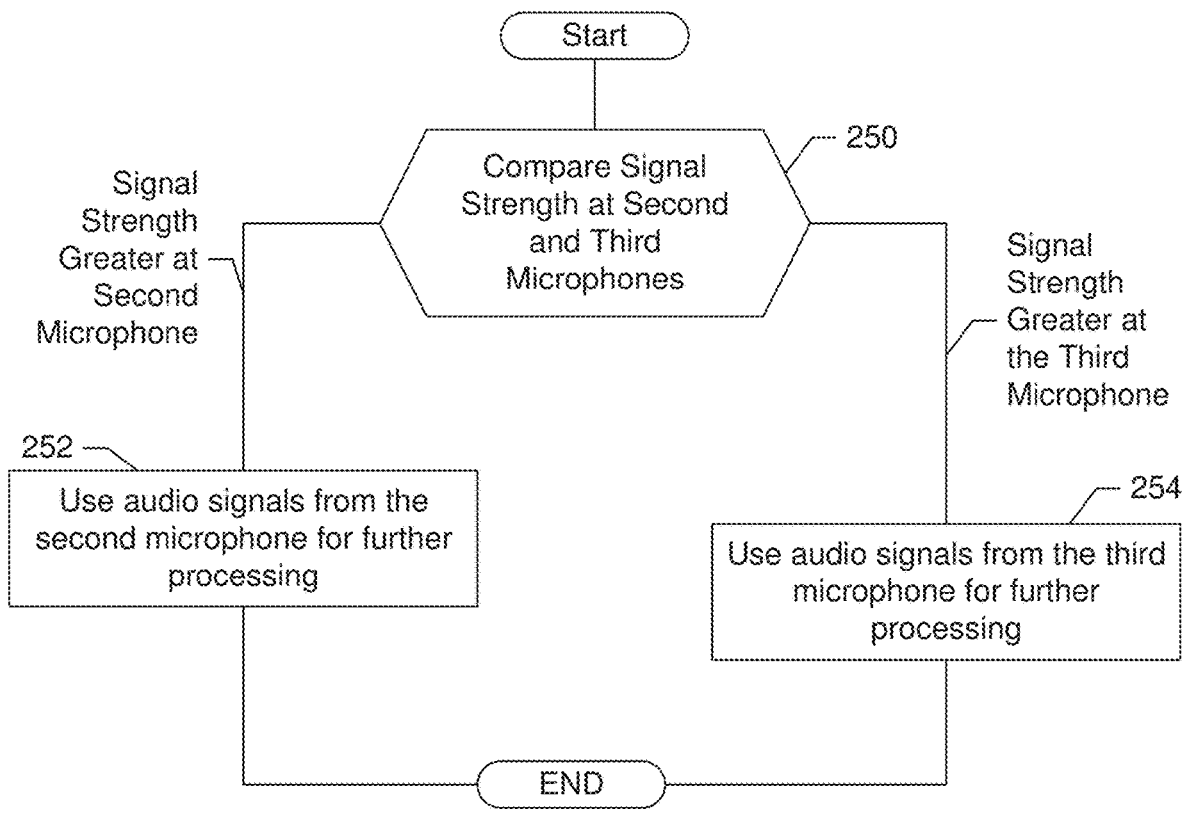

Turning to FIGS. 2A and 2B, in one or more embodiments both of the methods shown in FIG. 2A and FIG. 2B may be performed concurrently. The methods shown in FIG. 2A and FIG. 2B recognize that high fidelity data collection of speech requires processing of frequencies between about 0.1 kilohertz to about 11 kilohertz. The methods shown in FIG. 2A and FIG. 2B also recognize that the frequency response of the second-order microphones disposed on the walls of the mounting positions develop acoustic anomalies above about four kilohertz due to the distance between the reflective surface (i.e., the wall) and the baffle of the second-order microphone. Because the frequency range of the acoustic anomalies depends on the distance between the wall and the baffle of the second-order microphone, the selected value of four kilohertz may vary if the distance between the wall and the baffle of the second-order microphone is varied.

FIG. 2A shows a method of processing audio signals using the audio device (100) shown in FIG. 1A and FIG. 1B, in accordance with one or more embodiments of the invention. The method shown in FIG. 2A assumes that at least the omnidirectional microphone (124) and the second microphone (126) in FIG. 1A are present. The method shown in FIG. 2A may be characterized as part of a noise rejection or noise abatement process.

At step 200, the audio device receives sound signals as input signals. The same sound signals are received at both the omnidirectional microphone(s) and the second-order microphone(s). The same sound signals received at the two sets of microphones are processed differently based on a frequency threshold. In other words, while each set of microphones receives the same sound signals, different filtering is performed for signals generated by the different types of microphones based on the frequency threshold. The frequency threshold may be, in one example, about four kilohertz, though this number may be adjusted to different frequencies for particular applications.

At step 202, the omnidirectional microphone(s) are used for frequencies above the frequency threshold. Alternatively, signals generated by the omnidirectional microphone(s) are processed by a high pass filter. A high pass filtering process is a process which allows signals above a threshold frequency to pass, but filters out or attenuates signals below the threshold frequency. In either case, a high pass output is formed.

Concurrently with steps 202 and 200 at step 204, the second-order microphone(s) are used for frequencies below the frequency threshold. Alternatively, signals generated by the second-order microphone(s) are processed by a low pass filter. A low pass filtering process is a process which allows signals below a threshold frequency to pass, but filters out or attenuates signals below the threshold frequency. In either case, a low pass output is formed.

At step 206, the high pass output of step 202 and the low pass output of step 204 are summed to produce a net output. Summing the two outputs may be performed by adding the two signals together using a processor.

Finally, at step 208, the net output is processed. For example, optionally, one or more additional filtering steps may be performed on the net output. In any case, the net output, whether or not further filtered, is transmitted electronically to a far-end audio device for conversion into audio signals at the far-end audio device. The method of FIG. 2A may terminate thereafter.

FIG. 2B shows a method of processing audio signals using the audio device (100) shown in FIG. 1A and FIG. 1B, in accordance with one or more embodiments of the invention. The method shown in FIG. 2B may be considered an expansion of step 204 of FIG. 2A. Thus, FIG. 2B assumes that the second-order microphones are being used. The remaining steps in FIG. 2B may be performed prior to reaching Step 206 in FIG. 2A.

The method shown in FIG. 2B assumes that all three of the omnidirectional microphone (124), the second microphone (126), and the third microphone (138) of FIG. 1A are present in the audio device (100). The method shown in FIG. 2B also assumes that the second microphone (126) and the third microphone (138) are second-order microphones, such as that shown in FIG. 6. Note that more than two sets of second-order microphones may be present, though for this example, only two second-order microphones are present: the second microphone and the third microphone.

At step 250, a comparison is made between the signal strength received at the two second-order microphones (i.e., the second microphone and the third microphone in this example). Sound waves coming from the direction that the second microphone faces causes the second microphone to generate larger audio signals than those produced by the third microphone, and vice versa. Thus, the determination of the direction of sound may be performed by determining which of the second microphone and the third microphone detects the largest audio signal (i.e., the greatest speech energy). A maximum energy algorithm may be used to select the audio signal of greater strength.

At step 252, based on a determination that the audio signals at the second microphone are larger than the same audio signals received at the third microphone, signals from the second microphone will be used for further processing. Conversely, at step 254, based on a determination that the audio signals at the third microphone are larger than the same audio signals received at the second microphone, signals from the third microphone will be used for further processing. In either case, it may be possible to still use signals from the microphone, which generates the lower audio signals, though generally the larger audio signals will be used in favor of the weaker audio signals.

The terms "larger" and "weaker" refers to the relative amplitudes of the sound waves, and hence the amount of electrical signal generated at the microphone on account of the sound wave. An audio signal can be larger at one microphone than at the other microphone because the microphones are pointed in different directions. Thus, while the same audio signals are being received at both microphones, the amplitudes of those audio signals will be less at one microphone than at the other microphone.

As an exception, the amplitudes of the audio signal received at the two microphones is the same if the speaker is speaking directly from the first axis (i.e., exactly equidistant between the two speakers). Such an event is rare, but if it occurs, then one or both microphones could be selected to receive and process the audio signals.

Stated differently, talkers located on the left half of a room are picked up by the leftward pointing microphone. Conversely, talkers located on the right half of the room are picked up by the rightward pointing microphone. An algorithm (based on maximum energy) chooses the best of the two microphones to transmit audio to the far-end.

In this manner, for an audio device with the dimensions mentioned above, the narrow beam of the second-order microphone is effectively increased. For the exemplary dimensions mentioned above, the −3 dB (decibel) width of a single microphone beam is +/−33 degrees. With the system of two microphone beams in the arrangement disclosed (plus and minus twenty degrees for the two acute angles), the effective −3 dB coverage width is increased to +/−53 degrees.

In another embodiment, audio signals may be processed by both the second and third microphones. In this case, the two microphones also serve effectively for stereo audio pickup.

While the various steps in these flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 3, FIG. 4, and FIG. 5 show different views of a single example of a teleconferencing audio device, in accordance with one or more embodiments of the invention. Thus, FIG. 3 through FIG. 5 should be viewed together, and accordingly share common reference numerals which refer to the same objects in the different views. Teleconferencing device (500) is a specific example of audio device (100), shown in FIG. 1A and FIG. 1B.

Parts of the teleconferencing device (500) are described with reference to three defined axis: first axis (502), second axis (504), and third axis (506), which are all perpendicular to each other. The orientation of all three axes with respect to the near end user will vary depending on how the teleconferencing device (500) is situated or mounted with respect to the user.

However, by way of example for easy reference, assume that the teleconferencing device (500) is resting on a table that is horizontal with respect to the ground and that the table is, itself, horizontal with respect to the direction of gravity. In other words, assume the teleconferencing device (500) is resting on a flat table which is on a flat floor. If the teleconferencing device is resting on a table, then the bottom surface is the surface of the teleconferencing device that is directly adjacent to the table. In another example, the teleconferencing device may be mounted against a wall. In such a scenario, the bottom surface is located underneath the audio device and is perpendicular to the wall.

In this example, the first axis (502) is a horizontal axis that points generally towards one or more near end users. Thus, the first axis (502) is pointed outwardly towards the near end user(s) and also inwardly of the teleconferencing device (500), in the same manner that a first mounting position (508) and a second mounting position (510) are pointed inwardly of the teleconferencing device (500). The second axis (504) is a horizontal axis, parallel to the table, that is extends from side to side through a center of the teleconferencing device (500). The third axis (506) extends through the teleconferencing device (500) and extends upwardly and downwardly, vertically with respect to the table, along the direction of gravity.

Note that, in FIG. 4, the first axis (502) is "up and down" as shown in the figure because FIG. 4 is a "top down" view of the teleconferencing device (500). However, the first axis (502) is pointing into and out of FIG. 3 because FIG. 3 is a "side view" of the teleconferencing device (500) (i.e., what the near end user sees when looking directly at the facing side (526) of the device). Similarly, in FIG. 4, the second axis (506) is pointing into and out of FIG. 4, but is "up and down) in FIG. 3. In FIG. 5, the orientation of the three orthogonal axes are angled accordingly. Thus, the same reference numerals for the axes shown in FIG. 3 through FIG. 5 refer to the same axes.

With the above-defined axes, the term "acute angle," as used herein, is now defined. The "acute angle" is any angle in the same orientation as "theta" (Θ) (512), shown in FIG. 4, and is specifically defined as an angle of less than ninety degrees as measured in a plane parallel to a reference plane defined by the first axis (502) and the second axis (504). Thus, for example, the first wall (518) of the first mounting position (508) is disposed inwardly (relative to the facing surface (526) of the teleconferencing device (500) facing the near end user) at a first acute angle. Likewise, the second wall (520) of the second mounting position (510) is disposed inwardly at a second acute angle that is oriented opposite of the first acute angle. As a specific, non-limiting example, the acute angle of the first mounting position (508) may be positive twenty degrees and the acute angle of the second mounting position (510) may be negative twenty degrees. "Positive" in this case indicates an angle measured starting from first axis (502) and drawn to the left toward the second axis (504) (as shown in FIG. 4), and "negative" in this case indicates an angle measured starting from the first axis (502) and drawn to the right toward the second axis (504) (as shown in FIG. 4). However, the reference to "positive" and "negative" acute angles may be reversed, if convenient.

The acute angle of each mounting position may be congruent, but need not be the same. Additionally, while the mounting positions are shown as being symmetrical about the first axis (502), the second axis (504), and the third axis (506), the mounting positions need not be symmetrical about one or more of these axes.

Each mounting position may have different shapes, and the mounting positions need not have the same shape. For example, a mounting position may be defined by a single curved wall, or by multiple walls disposed at multiple angles with respect to each other as defined between the first axis (502) and the second axis (504), or any of the three axes.

However, in the example of FIG. 3, each mounting position has the shape of a triangular solid defined by a first wall and a corresponding opposing second wall. Thus, for example, the first wall (518) of the first mounting position (508) is opposite the second wall (522) of the first mounting position (508). Similarly, the third wall (520) of the second mounting position (510) is opposite the fourth wall (524) of the second mounting position (510). The first wall (518) and the second wall (522) join at a third angle, and the third wall (520) and the fourth wall (524) join at a fourth angle, as shown in FIG. 3. All of the walls, and all other parts of the facing side (526) of the teleconferencing device (500), may be contiguous with each other (either attached to each other or formed integrally with each other) or may be discontinuous with each other (i.e., a gap may be present between walls or sections of the facing side (526)).

Several operable microphones are connected to the facing side (526) of the teleconferencing device (500). Omnidirectional microphone (528) and omnidirectional microphone (530) are disposed in a first portion (532) of the facing side (526) that is between the first mounting position (508) and the second mounting position (510). The omnidirectional microphones may be configured to receive only frequencies above about four kilohertz, or a processor may process only the portion of sound signals received by the omnidirectional microphones above about four kilohertz. As indicated above with respect to FIG. 1A and FIG. 1B, this frequency range may be varied.

Additionally, a first second-order microphone (534) may be disposed on the first wall (518) of the first mounting position (508). An additional second-order microphone (536) may be disposed on the third wall (52) of the second mounting position (510).

The first second-order microphone (534) may be a first-order microphone disposed in or mounted on a first baffles (538). The first baffles (538) is, in turn, mounted a first distance outwardly from the first wall (518). Mounting may be accomplished by one or more posts, such as post (540) shown in FIG. 4. The first distance may be selected for proper operation of the first second-order microphone (534). "Proper operation" of a single second-order microphone is known to those of skill in the art, such as described in U.S. Pat. No. 4,965,775 (though the arrangement of multiple second-order microphones combined with the other features shown herein are not known and represent an improvement over similar audio devices for the reasons given elsewhere herein). The first baffles (538), as shown, takes the shape of a disc, but may have different shapes. The first baffles (538) may be parallel to the first wall (518).

Similarly, the additional second-order microphone (536) may be an additional first-order microphone disposed in or mounted on a second baffles (542). The second baffles (542) is, in turn, mounted a second distance outwardly from the third wall (520). Mounting may be accomplished by one or more posts, such as post (544) shown in FIG. 4. The second distance may be selected for proper operation of the additional second-order microphone (536). The second baffles (542), as shown, takes the shape of a disc, but may have different shapes. The second baffles (542) may be parallel to the third wall (520).

In an embodiment, the first second-order microphone (534) and the additional second-order microphone (536) may be configured to receive audio signals below about four kilohertz. Alternatively, a processor may be configured to process only the portion of the audio signals received at the two second-order microphones below about four kilohertz. These values may be varied, as described above with respect to FIG. 1A and FIG. 1B.

In addition, a first speaker (546) and a second speaker (548) may be disposed on the facing side (526) of the teleconferencing device (500). In particular, the first speaker (546) is disposed on a second portion (514) of the facing side (526) and the second speaker (548) is disposed on a third portion (516) of the facing side (526). As shown in FIG. 3, the second portion (514) is opposite the first portion (532) relative to the first mounting position (508). The third portion (516) is opposite the first portion (532) relative to the second mounting position (510).

Each speaker, and second-order microphone, are also placed such that audio signals emitted by a speaker are in a null of the second-order microphone. Thus, for example, the first speaker (546) may be situated such that it resides in a null of the first second-order microphone (534). Similarly, the second speaker (548) may be situated such that it resides in a null of the additional second-order microphone (536). In this manner, audio feedback from the far end into the microphones may be reduced or eliminated.

FIG. 5 shows another view of the teleconferencing device (500). First axis (502), second axis (504), and third axis (506) are shown in perspective. As can be seen, the first second-order microphone (534) and the additional second-order microphone (536) are disposed inwardly of the teleconferencing device (500) at an acute angle within a plane parallel to a reference plane defined by the first axis (502) and the second axis (504). The acute angle may be formed as a result of the acute angles the first wall (518) and the second wall (520) make with respect to the facing side (526) that lies at least in part along a plane defined by the second axis (504) and the third axis (506). Because the second-order microphone baffles are mounted parallel to these sides, the second-order microphones are pointed at the same acute angles as these sides.

FIG. 6 shows an example of a second-order microphone used in the audio device (100) shown in FIG. 1A and FIG. 1B, or in the teleconferencing audio device (500) shown in FIG. 3 through FIG. 5, in accordance with one or more embodiments of the invention. Thus, second-order microphone (600) may be second-order microphone (534) or second-order microphone (536) of FIG. 3 through FIG. 5. Operation and use of a single second-order microphone (600) is described in U.S. Pat. No. 4,965,775 (though the arrangement of multiple second-order microphones combined with the other features shown herein are not known and represent an improvement over similar audio devices for the reasons given elsewhere herein).

The second-order microphone (600) includes a disc (602) mounted a distance (604) from an audio-reflective surface (606) via one or more posts, such as post (608). The distance (604) may be varied to change the frequency range of operation of the second-order microphone (600), though in one specific example the distance may be 0.45 inches. Similarly, the disc (602) may be varied in size and shape, though in one specific example the disc (602) may be 1.5 inches in diameter.

A microphone receiver (610), which may be a first-order microphone, may be disposed in the center of the disc (602), or may be disposed elsewhere within the disc (602). The microphone receiver (610) may be a variety of different microphone elements, though in a specific embodiment the microphone receiver (610) may be a cardioid electret capsule. The microphone receiver (610) is connected to a processor or processing electronics via an electrical lead (not shown), which is disposed through the audio-reflective surface (606) and into the microphone receiver (610).

Optionally, one or more feet, such as foot (614), may be used to secure the posts, such as post (608). The feet may also provide vibration dampening so that vibrations in the audio-reflective surface (606) (whether caused by audio waves or other vibration of the audio device) contribute less or no signal to the sound wave signals detected by the microphone receiver (610). The feet may also be referred to as pads, dampeners, rings, or seals.

Some of the components shown in FIG. 6 correspond to components shown in FIG. 5. For example, the second-order microphone (600) may refer to the first second-order microphone (534) or the additional second-order microphone (536). The disc may be first baffles (538) or the second baffles (542). The audio-reflective surface (606) may be the first wall (518) of the first mounting position (508) or the second wall (520) of the second mounting position (510). The post (608) may be the post (540).

The embodiments contemplate many different audio devices in many different configurations. For example, the teleconferencing device (500) may include a camera and form a teleconferencing audio and video device. In another example, the teleconferencing device (500) may also be coupled with a screen for displaying video data transmitted by a far end device. Other variations are also contemplated. Thus, the examples shown in FIG. 3 through FIG. 6 do not necessarily limit the claimed inventions or other possible configurations for an audio or video device, as described elsewhere herein.

Figure 7:
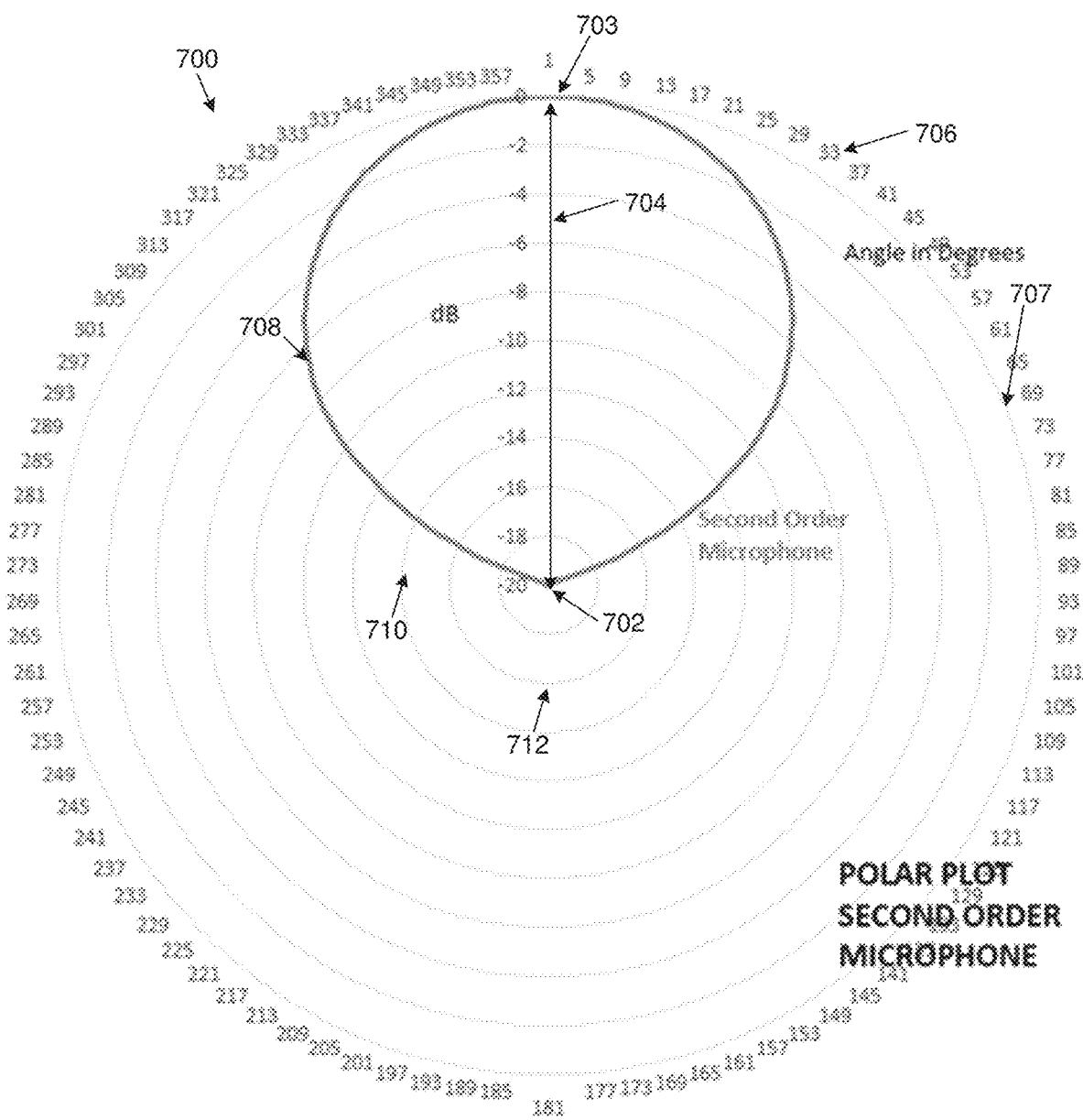
FIG. 7 shows a graph of a polar plot of audio reception in a second-order microphone, such as the second-order microphone shown in FIG. 6.

FIG. 7 shows a graph (700) of a polar plot of audio reception in a second-order microphone, such as the second-order microphone shown in FIG. 6. The center point (702) of graph (700) is the location of the second-order microphone. The second-order microphone may be second microphone (126) or the third microphone (138) in FIG. 1A. As another example, the second-order microphone may be the first second-order microphone (534) or the additional second-order microphone (536) in FIG. 5.

In general, a polar plot shows a magnitude with relation to an angle. The radii drawn in FIG. 7 reflect the physical distance from the second-order microphone to the audio source. The greater the distance from the second-order microphone (i.e., center point of the polar plot) to the audio source, the more attenuated the audio signal. The degree of attenuation of the strength of the audio signal is measured in decibels (dB). In FIG. 7, if the audio source is located at point (703) from the center point (702) along radius (704), then an attenuation of 0 dB is measured.

The angles (706) indicate the angle formed between a reference direction (radius 704 in this case) and an imaginary line drawn between the center point (702) and the location of the audio source. Thus, if the audio source were located at point (707), then the angle would be about 70 degrees.

Plot (708) shows the physical areas in which the second-order microphone can detect sound waves. The ability of the second-order microphone to detect sound waves varies both with the distance to the source of the sound waves, as well as the angle of the source of the sound waves relative to the second-order microphone.

For example, at a distance at which the dB is −4 on graph (700), the second-order microphone may receive audio signals between about 320 degrees and 40 degrees (to the left and to the right of the second-order microphone, respectively). Outside of these angles, the second-order microphone cannot detect the sound waves at the corresponding distance.

Even for points very close to the second-order microphone, there are angles at which the second-order microphone cannot detect sound waves or only may detect the sound waves weakly. For example, at a distance at which the dB is −18 on the graph (700), the second-order microphone cannot detect sound waves outside of the angle range of about 280 degrees to about 80 degrees (to the left and to the right of the second-order microphone, respectively).

Those physical locations at which the second-order microphone cannot detect sound waves are called nulls of the second-order microphone. Thus, for example, point (710) is at a null of the second-order microphone. Point (710) corresponds to a distance to the second ring (712) at about 280 degrees to the left of the second-order microphone. The second-order microphone cannot detect, or can detect very little, of any sound waves emanating from point (710), and hence is a null of the second-order microphone.

The plot (708) may be unique to a particular kind of second-order microphone. Different second-order microphones can have different dB (decibel) plots.

The one or more embodiments take advantage of the null of a second-order microphone demonstrated in FIG. 7. For example, as shown above, the speakers can be placed at nulls of the second-order microphones. Thus, for example, in FIG. 5, the first speaker (546) can be placed at a null of the first second-order microphone (534) and the second speaker (548) can be placed at a null of the additional second-order microphone (536). In this manner, undesirable audio feedback from the speakers can be avoided.

For the specific embodiments shown, several improvements are obtained in the performance of the audio device. The two microphone disks are angled at +/−20 degrees. Talkers located on the left half of the room are picked up by the leftward pointing microphone. Conversely, talkers located on the right half of the room are picked up by the rightward pointing microphone. An algorithm (based on maximum energy) chooses the best of the two microphones to transmit audio to the far-end. In this manner, the narrow beam of the second-order microphone is effectively increased. The −3 dB width of a single microphone beam is +/−33 degrees. With the system of two microphone beams in the arrangement disclosed, the effective −3 dB coverage width is increased to +/−53 degrees. The two microphones also serve effectively for stereo audio pickup.

Additionally, the frequency response of the second-order cardioid system may develop anomalies above a certain frequency due to the distance between the reflective surface and the baffle. For the physical configuration as shown, this frequency is approximately 4 kHz.

However, high quality speech may require frequencies to 11 kHz. To circumvent this issue, an array of omnidirectional microphones is used for these higher frequencies. For frequencies below about 4 kHz, the second-order microphones are used. For frequencies greater than about 4 kHz, the omnidirectional microphone array is used.

In typical conference room environments, reverberance and noise is much worse for the frequency range below 4 kHz compared to the higher frequencies. Therefore, the benefits of the second-order microphone system are significant in reducing overall reverberance and noise in speech pick-up, even though it is only used for frequencies below 4 kHz.

Finally, in the teleconferencing system described, the second-order microphone positioning places a null towards the left and right loudspeakers, which is of benefit in minimizing problems of pick-up of loudspeaker sound by the microphones. Thus, the one or more embodiments may provide for full-duplex operation, allowing both near-end speakers and far-end speakers to talk over each other without being cut out by the audio device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An audio device comprising:
   a housing comprising a side facing outwardly of the housing, the housing further comprising a first mounting position disposed on the side,
   wherein the side comprises a first portion and a second portion, the first portion opposite the second portion relative to the first mounting position;
   a first omnidirectional microphone disposed on the first portion;
   a second microphone disposed on the first mounting position, the second microphone comprising a second-order microphone, the second-order microphone comprising a first-order microphone disposed within a first platform mounted a distance from the first mounting position; and
   a first speaker disposed on the second portion, wherein the first speaker is further disposed such that an audio output of the first speaker falls within a null of the second microphone.

2. The audio device of claim 1, wherein the first mounting position is inset within the housing relative to a surface of the side.

3. The audio device of claim 1, wherein the first mounting position protrudes outwardly from the housing relative to a surface of the side.

4. The audio device of claim 1, wherein the audio device further comprises:
   a second speaker disposed on a third portion of the side, opposite the first speaker; and
   a third microphone disposed on a second mounting position disposed on the side, wherein:
   the second mounting position is opposite the first mounting position relative to the first portion of the side;
   the third microphone comprises an additional second-order microphone,
   the additional second-order microphone comprises an additional first-order microphone disposed within a second platform mounted the distance away from the second mounting position, and
   the second speaker is further disposed such that a second audio output of the second speaker falls within a second null of the third microphone.

5. The audio device of claim 4, further comprising:
   a second omnidirectional microphone disposed on the first portion.

6. The audio device of claim 5, wherein:
   the first omnidirectional microphone and the second omnidirectional microphone are used for frequencies above about four kilohertz, and
   the second microphone and the third microphone are used for frequencies below about four kilohertz.

7. The audio device of claim 4, wherein:
   the first mounting position is at a first acute angle relative to the side;
   the first mounting position forms a first inset disposed inwardly within the housing;
   the second mounting position is at a second acute angle relative to the side;
   the second mounting position forms a second inset disposed inwardly within the housing;
   the first platform is about parallel to the first mounting position; and
   the second platform is about parallel to the second mounting position.

8. The audio device of claim 7, wherein:
   the first acute angle is between about positive five degrees and about positive forty-five degrees;
   the second acute angle is between about negative five degrees and about negative forty-five degrees.

9. The audio device of claim 7, wherein the first acute angle is congruent with the second acute angle.

10. The audio device of claim 4, wherein:
    the first mounting position is at a first acute angle relative to the side;
    the first mounting position is disposed outwardly from the housing;
    the second mounting position is at a second acute angle relative to the side;
    the second mounting position is disposed outwardly from the housing;
    the first platform is about parallel to the first mounting position; and
    the second platform is about parallel to the second mounting position.

11. The audio device of claim 4, further comprising:
    a processor configured to:
    compare a first signal strength at the second microphone to a second signal strength at the third microphone by implementing a maximum energy algorithm to determine a greater signal strength, wherein a greater signal is determined; and
    further process the greater signal.

12. The audio device of claim 1, wherein the housing further comprises a swivel mount that allows rotation of the housing with respect to a surface upon which the housing rests.

13. The audio device of claim 5, comprising a microphone array including the first omnidirectional microphone and the second omnidirectional microphone.

14. The audio device of claim 1, further comprising:
    an optical camera connected to the housing.

15. The audio device of claim 14 wherein the audio device comprises an audio-visual conferencing system.

16. A method of processing audio signals, comprising:
    receiving, at an audio device, sound signals as input signals, wherein the audio device comprises an omnidirectional microphone and a first second-order microphone;
    using the omnidirectional microphone for frequencies above about four kilohertz to generate a high pass output;

using the first second-order microphone for frequencies below about four kilohertz to generate a low pass output;
summing the high pass output and the low pass output to produce a net output; and
processing the net output.

17. The method of claim 16, wherein the audio device further comprises an additional second-order microphone, wherein the first second-order microphone faces a first direction at a first acute angle with respect to a side of the audio device, and wherein the additional second-order microphone faces a second direction at a second acute angle with respect to the side of the audio device, and wherein the method further comprises:
comparing a first signal strength of the audio signals received at the first second-order microphone to a second signal strength of the audio signals received at the additional second-order microphone;
selecting one of the audio signals received at the first second-order microphone and the audio signals received at the additional second-order microphone as a greater signal; and
wherein receiving and processing the audio signals below about four kilohertz is performed using the greater signal.

18. A method of manufacturing comprising:
manufacturing a housing comprising a side facing outwardly of the housing, the housing further comprising a first mounting position disposed on the side,
wherein the side comprises a first portion and a second portion, the first portion opposite the second portion relative to the first mounting position;
connecting a first omnidirectional microphone to the first portion;
connecting a second microphone to the first mounting position, the second microphone comprising a second-order microphone, the second-order microphone comprising a first-order microphone disposed within a first platform mounted a distance from the first mounting position; and
connecting a first speaker disposed on the second portion, wherein the first speaker is further disposed such that an audio output of the first speaker falls within a null of the second microphone.

19. The method of claim 18, further comprising:
insetting the first mounting position within the housing relative to a surface of the side.

20. The method of claim 18, further comprising:
setting the first mounting position to protrude outwardly from the housing relative to a surface of the side.

* * * * *